United States Patent [19]

DiRocco et al.

[11] 4,399,854

[45] Aug. 23, 1983

[54] TIRE REPAIR PATCH AND METHOD OF MANUFACTURE

[76] Inventors: Jobbie DiRocco, 3424 Sweetbriar Ave., Akron, Ohio 44321; David J. DiRocco, 7090 Grove Rd., Clinton, Ohio 44216

[21] Appl. No.: 273,978

[22] Filed: Jun. 15, 1981

[51] Int. Cl.³ .................. B60C 21/02; B60C 21/04
[52] U.S. Cl. .................. 152/367; 152/370; 156/97; 156/322
[58] Field of Search ............. 152/367, 370, 368, 369; 156/97, 322

[56] References Cited

U.S. PATENT DOCUMENTS

| | | | |
|---|---|---|---|
| 1,339,696 | 5/1920 | Duffy | 152/367 |
| 1,480,976 | 1/1924 | Wight | 152/367 |
| 3,933,553 | 1/1976 | Seiberling | 156/123 R |
| 4,202,717 | 5/1980 | Seiberling | 152/362 R |
| 4,285,382 | 8/1981 | DiRocco et al. | 152/367 |

FOREIGN PATENT DOCUMENTS 868380  5/1961  United Kingdom ............... 152/367

*Primary Examiner*—Edward C. Kimlin
*Assistant Examiner*—F. K. Wine
*Attorney, Agent, or Firm*—Frederick K. Lacher

[57] ABSTRACT

A tire repair patch having at least one ply package enveloped by an unvulcanized base cushion gum layer and an unvulcanized top cushion gum layer joined at the edges of the ply package. The overlapping plies of reinforcing cords in the ply package are coated with rubber and are at least partially vulcanized prior to assembly of the patch to increase the strength of the patch and decrease the curing time upon application to a tire.

The patch is made by coating the plies with rubber, laying the plies one on top of the other to form the ply package, heating the package to cure the rubber coating and then positioning the ply package between the unvulcanized cushion gum layers. An unvulcanized intermediate cushion gum layer may be positioned between two ply packages where there is more than one ply package in the patch.

14 Claims, 10 Drawing Figures

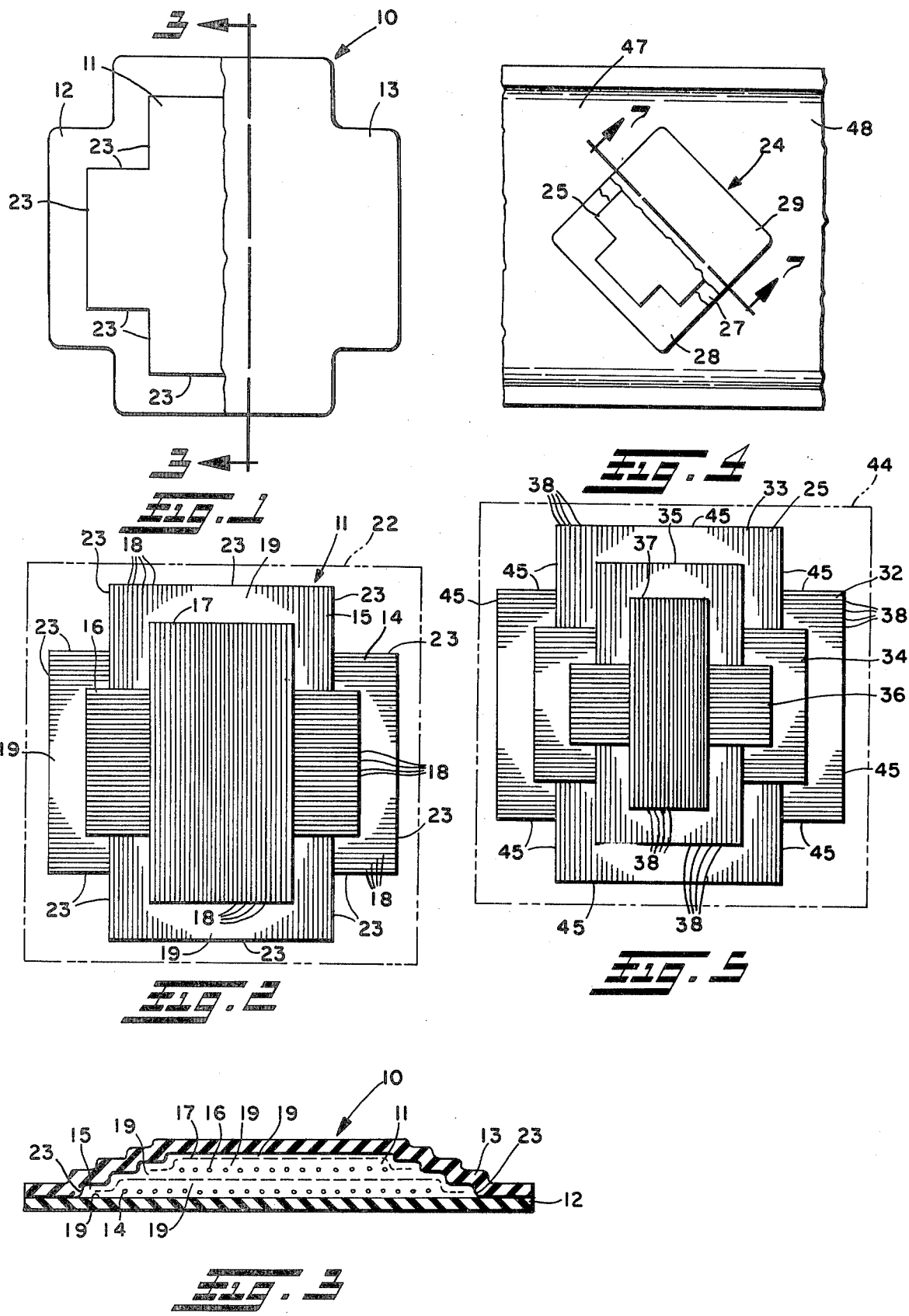

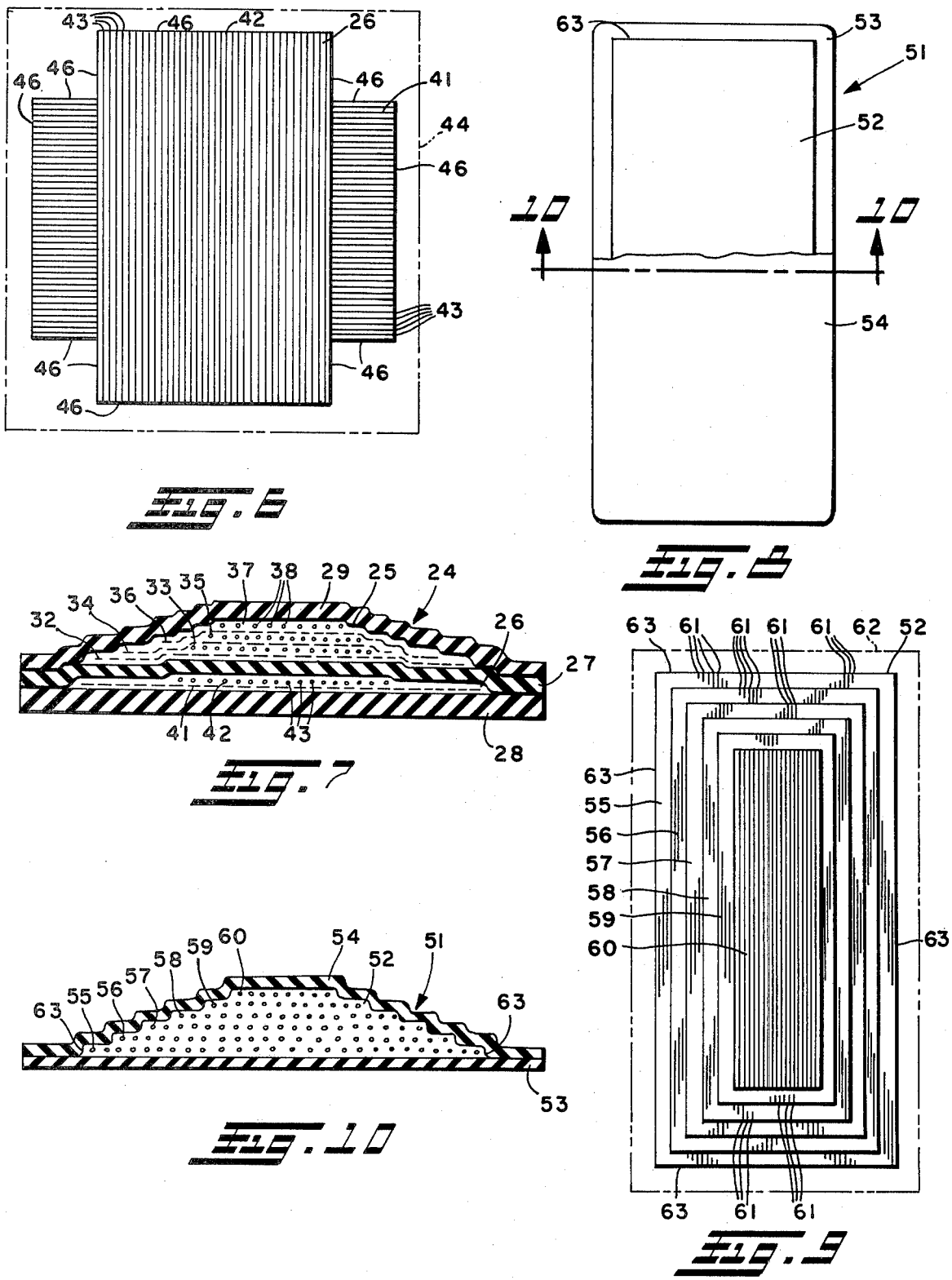

TIRE REPAIR PATCH AND METHOD OF MANUFACTURE

BACKGROUND OF THE INVENTION

In the application of tire repair patches to the surface of tires and especially large truck and off the road vehicle tires uncured patches are preferred because they have the greatest adhesion to the tires. The uncured patch is heated with the tire in an autoclave or mold which requires a substantial amount of energy in the form of heat applied over a significant number of hours. Not only is the energy requirement high but the heating time is added to the heat history of the tire and reduces the number of times the tire can be retreaded.

An extended heating time is required because the heat must be transmitted to the reinforcing plies through the cushion gum layers surrounding the plies. Also on the tire wall side of the patch the heat must be transmitted through the tire wall as well as the cushion gum layer.

When a tire has needed repair and retreading it has been the practice to insert a plug core in the injury, apply the uncured patch and then put the tire in an autoclave for curing the patch and plug at elevated temperatures for about 8 to 10 hours. After this the tire has been buffed and placed in a retread mold for about 12 to 18 hours to cure the new tread at elevated temperatures and pressures. It has not been possible to cure the plug core and uncured patch during the retreading operation because the patch does not have sufficient strength to bridge the injury and is deformed into the plug.

In an effort to save time the tire has been repaired by inserting a plug core in the tire wall injury and then spot curing that part of the tire. A chemical patch has then been applied and is adhered to the tire wall during the retreading operation. Although there is a time saving the adhesion obtainable with this method is substantially less than that provided by an uncured patch. The cost of the chemical cure patch is also greater than the cost of an uncured patch.

SUMMARY OF THE INVENTION

The patch of this invention provides for a shorter cure time than that required for an uncured patch while at the same time the adhesion and freedom from delamination is comparable to that provided by an uncured patch. The new patch also has sufficient strength to bridge holes in a tire so that it may be applied prior to retreading and then cured during the retreading operation. The cost of the patch is less than the cost of chemical patches and the adhesion and sealing of the edges is increased by the increased flow of gum at the edges during cure. Furthermore the patch of this invention makes possible a greater number of retreading operations. Energy savings are also realized because a number of ply packages may be cured at the same time prior to assembly. When the patches are applied to the tire only the number of patches required per tire can be cured at one time.

In accordance with one aspect of the invention a tire repair patch is provided having a ply package of at least two overlapping plies of reinforcing cords, an unvulcanized base cushion gum layer at the underside of the patch for engagement with the surface of the tire, an unvulcanized top cushion gum layer at the opposite side of the patch from the underside, the base and top cushion gum layers being joined at a location beyond the edges of the ply package, each of the overlapping plies of the ply package having a rubber coating and the ply package being at least partially vulcanized to increase the strength of the patch and reduce the curing time required to apply the patch to the surface of the tire.

In accordance with another aspect of the invention a method of making a tire repair patch is provided comprising the steps of:

A. Coating at least two plies of reinforcing cords with rubber,

B. Laying the plies one on top of the other to form a ply package,

C. Heating the ply package to at least partially vulcanize the rubber coating the plies, D. Positioning the ply package between an unvulcanized top cushion gum layer and an unvulcanized base cushion gum layer with the cushion gum layers being joined beyond the edges of the ply package.

BRIEF DESCRIPTION OF THE DRAWINGS

FIG. 1 is a plan view of a tire repair patch embodying the invention with the top cushion gum layer being broken away to show the ply package.

FIG. 2 is an enlarged view of the ply package for the tire repair patch of FIG. 1 showing the plies in an autoclave prior to vulcanization and assembly in the patch.

FIG. 3 is an enlarged sectional view of the patch taken along the line 3—3 in FIG. 1.

FIG. 4 is a fragmentary view of the inside of a tire showing another embodiment of the tire repair patch of this invention bonded to the inside surface of the tire with the top cushion gum layer and the intermediate cushion gum layer broken away to show the ply package.

FIG. 5 is an enlarged view of the top ply package for the tire repair patch of FIG. 4 showing the plies in an autoclave prior to vulcanization and assembly in the patch.

FIG. 6 is an enlarged view of the bottom ply package for the tire repair patch of FIG. 4 showing the plies in the autoclave of FIG. 5 prior to vulcanization and assembly in the patch.

FIG. 7 is an enlarged sectional view of the tire repair patch taken along the line 7—7 in FIG. 4 but not showing the tire.

FIG. 8 is a plan view of another modification of the tire repair patch of the invention with the top cushion gum layer being broken away to show the ply package.

FIG. 9 is an enlarged view of the ply package for the tire repair patch of FIG. 8 showing the plies in an autoclave prior to vulcanization and assembly in the patch.

FIG. 10 is a sectional view of the tire repair patch of FIG. 8 taken along the line 10—10 in FIG. 8.

DETAILED DESCRIPTION

Referring to FIGS. 1, 2 and 3 a tire repair patch 10 is shown having a ply package 11 which may be at least partially vulcanized positioned between an unvulcanized base cushion gum layer 12 and an unvulcanized top cushion gum layer 13.

As shown more clearly in FIG. 2 the ply package 11 has overlapping plies 14, 15, 16 and 17 of reinforcing cords 18. In the embodiment shown the plies 14 through 17 have reinforcing cords 18 of nylon which may be spaced from 10 to 40 ends per inch and be of a 2200 denier. Alternatively the cords 18 may be of nylon, polyester, polyamides or wire. The cords 18 of the plies 14 through 17 may be skim coated with a rubber coating 19 of natural or SBR rubber applied as by calendering with each ply having a thickness of from 0.018 to 0.025 inches and with a calender thickness of from 0.023 to 0.035 inches. Alternatively the cords 18 may be coated with reclaim, a blend of natural and SBR or a blend of natural, reclaim and SBR rubbers.

The plies 14 through 17 of the ply package 11 are preferably elongated strips of reinforcing cords 18 which extend substantially longitudinally of the strips and which are held in side by side relationship by pick cords or other suitable means such as an adhesive. The plies 14 through 17 are in criss-cross relationship with the cords 18 of adjacent plies positioned at substantially right angles. Also the larger plies are closer to one side of the package 11 and the smaller plies are closer to the other side.

After the plies 14 through 17 of the ply package 11 are coated with the rubber coating 19 and laid one on top the other to form the ply package 11 the package is placed in a heated chamber such as a press or an autoclave 22 shown schematically in FIG. 2. The ply package 11 is then subjected to a predetermined temperature for a predetermined time to at least partially vulcanize the rubber coating 19 on the plies 14 through 17 providing a unified body having sufficient strength to bridge an injury in a tire surface. In this embodiment the ply package 11 is heated at a temperature of about 300° F. for 20 minutes. Prior to placing the ply package 11 in the autoclave 22 the plies 14 through 17 may be pressed together by a roller or stitcher for ejecting any air that may be trapped between the plies.

After removing the cured ply package 11 from the autoclave 22 it is placed with the larger plies 14 and 15 adjacent the base cushion gum layer 12 and covered with the top cushion gum layer 13. A roller or stitcher may be used to press the top and bottom cushion gum layers 12 and 13 against the ply package 11 to remove any air from the patch 10.

The base and top cushion gum layers 12 and 13 are preferably of a resilient rubberlike material such as natural rubber and alternatively of SBR rubber, a blend of natural and SBR rubbers or a blend of polybutadienes having a thickness greater than the thickness of any of the plies 14 through 17. In the embodiment shown the base cushion gum layer 12 has a thickness of from 0.015 to 0.500 inches. The top cushion gum layer 13 has a thickness of from 0.015 to 0.500 inches. The edges of the base and top cushion gum layers 12 and 13 overlap and are joined at locations beyond edges 23 of the ply package 11. After assembly of the patch 10 it may be covered by polyethylene or some other material which can be removed when the patch is to be used.

Although an autoclave 22 was illustrated in FIG. 2 the ply package 11 may be cured in a press having an air bag. It is also evident that a number of ply packages 11 may be cured in the autoclave 22 or press at the same time. It can be seen that by precuring the ply package 11 the time necessary to cure the patch 10 in the tire is reduced and not only is there a savings in energy because less heat is required to cure the patch in the tire but also by curing a number of ply packages in the press a savings in energy is realized. Another savings is possible with the patch 10 in that the ply package 11 has the strength to bridge an injury in the tire and therefore the patch can be cured while a tire is being retreaded. Here again there is a savings in time and energy as well as a decrease in the heat history of the tire so that the number of times it can be retreaded is not reduced.

Referring to FIGS. 4, 5, 6 and 7 another modification is shown in which a tire patch 24 has an upper ply package 25 shown in FIG. 5 and a lower ply package 26 with an unvulcanized intermediate cushion gum layer 27 positioned between the upper and lower ply packages. The lower ply package 26 is laid over an unvulcanized base cushion gum layer 28 and the upper ply package 25 is covered by an unvulcanized top cushion gum layer 29. The upper ply package 25 as shown in FIG. 5 has reinforcing plies 32, 33, 34, 35, 36 and 37 of reinforcing cords 38 in overlapping relationship. The plies 32 through 37 are preferably elongated strips of reinforcing cords 38 which extend substantially longitudinally of the strips. The plies 32 through 37 are in criss-cross relationship with the cords 38 of adjacent plies positioned at substantially right angles. Also the larger plies are closer to one side and the smaller plies are closer to the other side.

The lower ply package 26 as illustrated in FIG. 6 includes two plies 41 and 42 of reinforcing cords 43. The plies 41 and 42 are in criss-cross relationship with the cords 43 of adjacent plies positioned at substantially right angles. The plies 41 and 42 are of substantially the same size as the larger plies 32 and 33 of the upper ply package 25.

The upper ply package 25 and the lower ply package 26 may be made of the same materials and in a similar manner as the ply package 11 of the embodiment described and shown in FIGS. 1 through 3. After the upper ply package 25 and lower ply package 26 are constructed they are heated in a manner similar to that described for the ply package 11 and this may be in a press or an autoclave 44 illustrated schematically in FIGS. 5 and 6. The lower ply package 26 may be cured in 10 minutes at 300° F. and the upper ply package 25 may be cured in 30 minutes at 300° F.

The top cushion gum layer 29, base cushion gum layer 28 and intermediate cushion gum layer 27 are substantially the same size and extend beyond edges 45 and 46 of upper ply package 25 and lower ply package 26 where they are joined at a location beyond these edges. The intermediate cushion gum layer 27 in the embodiment shown has a thickness of from 0.015 to 0.500 inches similar to that of the top cushion gum layer 29.

The patch 24 may be assembled by placing the lower ply package 26 over the base cushion gum layer 28, positioning the intermediate cushion gum layer 27 over the lower ply package 26 and then positioning the upper ply package 25 over the intermediate cushion gum layer 27. The top cushion gum layer 29 is then placed over the top of the upper ply package 25. The patch 24 can be compressed by suitable means such as rolling so that substantially no air remains in the patch. The joined areas of the base, intermediate and top cushion gum layers 27, 28 and 29 are located beyond the edges 45 and 46 of the upper ply package 25 and lower ply package 26 provide a cushioning edge of the patch 24.

As shown in FIG. 4 the patch 24 may be applied to a tire 47 with the reinforcing cords 38 extending substantially in the same directions as the cords of the tire. The base cushion gum layer 28 is adhered to the tire 47 by first cleaning and buffing an inner surface 48 around the injury. A plug may be inserted in a skived opening at the injury and then the patch 24 of an appropriate size is installed over the injury with no distortion and stitched thoroughly from the center to the edges. The tire 47 is then placed in a section mold or kettle and the patch 24 cured in a conventional approved manner. It has been found however that the patch 24 of this invention may be cured in a shorter time because the upper ply package 25 and lower ply package 26 are already cured and the curing time constitutes only the time required to cure the base, intermediate and top cushion gum layers 27, 28 and 29.

Referring to FIGS. 8, 9 and 10 a modified tire repair patch 51 for radial tires is shown. A ply package 52 is positioned between an uncured base cushion gum layer 53 and an uncured top cushion gum layer 54. The ply package 52 as shown in FIG. 9 is made up of overlapping plies 55, 56, 57, 58, 59, 60 of reinforcing cords 61. The reinforcing cords 61 of the plies 55 through 60 extend in substantially the same direction and cords of each of the plies have a rubber coating. The plies 55 through 60 are positioned in overlapping relationship as shown in FIG. 9 with the larger plies adjacent one side and the smaller plies adjacent the other side of the ply package 52. The plies 55 through 60 may then be stitched together or rolled to remove any air and then heated at a predetermined temperature in a suitable container such as an autoclave 62 shown schematically in FIG. 9. The tire repair patch 51 may also be cured in a press.

After curing at a suitable temperature which may be around 300° F. for a period of time such as thirty minutes the ply package 52 may be removed from the autoclave 62 and then assembled by placing it over the base cushion gum layer 53 and covering it with the top cushion gum layer 54 so that the cushion gum layers are joined at locations beyond the edges 63 of the ply package.

The tire repair patch 51 may have similar cords and materials as those described for the embodiment of FIGS. 1 through 3 and also be assembled and cured in a similar manner. The application of the patch 51 to a radial tire is also similar in that the reinforcing cords 61 of the patch are placed so that they extend in substantially the same direction as the radial cords of the tire.

The savings in energy and time when repairing a radial truck tire are demonstrated by a comparison of the time required to apply a conventional uncured six ply patch to a radial truck tire and the time to apply a patch similar to tire repair patch 51 embodying this invention. With the conventional uncured patch ninety minutes was required to apply the patch whereas with the patch 51 embodying the invention only thirty-five to forty minutes was required. Similar savings in time can be realized with other patches embodying the invention because of the time saved due to the ply packages being cured.

While certain representative embodiments and details have been shown for the purpose of demonstrating the invention it will be apparent to those skilled in the art that various changes and modifications may be made therein without departing from the spirit or scope of the invention.

We claim:

1. A tire repair patch for application to a surface of a tire at an injured portion comprising a ply package of at least two overlapping plies of reinforcing cords, an unvulcanized base cushion gum layer at the underside of said patch for engagement with said surface of said tire, an unvulcanized top cushion gum layer at the opposite side of the patch from said underside, said base and top cushion gum layers being joined at a location beyond the edges of said ply package, each of said overlapping plies of said ply package having a rubber coating and said ply package being at least partially vulcanized prior to assembly with said base cushion gum layer and said top cushion gum layer to increase the strength of said patch and reduce the curing time required to apply said patch to said surface of said tire and said ply package being vulcanized in an amount to provide a unified body having sufficient strength to bridge an injury in a tire surface and prevent deformation into said injury.

2. A tire repair patch in accordance with claim 1 wherein said ply package has four overlapping plies of reinforcing cords with the cords of adjacent plies being positioned at substantially right angles.

3. A tire repair patch in accordance with claim 2 wherein each said base and top cushion gum layers has a thickness greater than the thickness of one of said plies.

4. A tire repair patch in accordance with claim 1 wherein said patch includes a second ply package and an unvulcanized intermediate cushion gum layer interposed between said first mentioned and said second ply packages, said intermediate, base and top cushion gum layers extending beyond the edges of said first mentioned and said second ply packages for joining of said layers.

5. A tire repair patch in accordance with claim 4 wherein each said base, intermediate and top cushion gum layer has a thickness greater than the thickness of one of said plies.

6. A tire repair patch in accordance with claim 4 wherein said first mentioned ply package has two rubber coated overlapping plies of reinforcing cords and the cords of one of said plies being positioned at right angles to the cords of the other of said plies.

7. A tire repair patch in accordance with claim 4 wherein said second ply package has six rubber coated overlapping plies of reinforcing cords and the cords of adjacent plies are positioned at right angles.

8. A tire repair patch in accordance with claims 6 or 7 wherein said first mentioned ply package is located between said base and intermediate cushion gum layers and said second ply package is located between said intermediate and said top cushion gum layers.

9. A tire repair patch in accordance with claim 1 wherein the cords of adjacent plies extend generally in the same direction.

10. A tire repair patch in accordance with claim 9 wherein said ply package has six rubber coated plies with the plies adjacent said base cushion gum layer having a larger area than the plies adjacent said top cushion gum layer.

11. A method for making a tire repair patch for application to a surface of a tire at an injured portion comprising the steps of:

A. coating at least two plies of reinforcing cords with rubber,

B. laying said plies one on top the other to form a ply package,

C. heating said ply package to a predetermined temperature for a predetermined time to at least partially vulcanize said rubber coating said plies in an amount to provide a unified ply package body having sufficient strength to bridge an injury in a tire surface and prevent deformation into said injury, and D. positioning said ply package between an unvulcanized top cushion gum layer and an unvulcanized base cushion gum layer with the cushion gum layers being joined beyond the edges of said ply package.

12. A method for making a tire repair patch according to claim 11 wherein said plies of said ply package are rolled prior to heating to remove the air from said package.

13. A method for making a tire repair patch according to claim 11 wherein said patch is rolled after said ply package is positioned within said base and top cushion gum layers.

14. A method for making a tire repair patch according to claim 11 wherein others of said plies are laid together to form a second ply package and said second ply package is heated to at least partially vulcanize said rubber coating and the others of said plies in said second ply package and interposing an unvulcanized intermediate cushion gum layer between said first mentioned and said second ply packages with said intermediate cushion gum layer being joined to said base and top cushion gum layers beyond the edges of said first mentioned and second ply packages.

* * * * *